United States Patent
Lim et al.

(10) Patent No.: US 11,363,598 B2
(45) Date of Patent: *Jun. 14, 2022

(54) METHOD FOR TRANSMITTING AND RECEIVING SIGNAL BY TERMINAL SUPPORTING DUAL-CONNECTIVITY BETWEEN E-UTRA AND NR AND TERMINAL PERFORMING THE METHOD

(71) Applicant: LG ELECTRONICS INC., Seoul (KR)

(72) Inventors: Suhwan Lim, Seoul (KR); Sangwook Lee, Seoul (KR); Jaehyuk Jang, Seoul (KR); Dongik Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 136 days.

This patent is subject to a terminal disclaimer.

(21) Appl. No.: 16/848,193

(22) Filed: Apr. 14, 2020

(65) Prior Publication Data

US 2020/0245329 A1 Jul. 30, 2020

Related U.S. Application Data

(63) Continuation of application No. 16/317,071, filed as application No. PCT/KR2018/012047 on Oct. 12, 2018, now Pat. No. 10,660,098.

(Continued)

(51) Int. Cl.
*H04W 72/00* (2009.01)
*H04W 72/04* (2009.01)
*H04W 88/06* (2009.01)

(52) U.S. Cl.
CPC ........ *H04W 72/0453* (2013.01); *H04W 88/06* (2013.01)

(58) Field of Classification Search
CPC . H04W 72/0453; H04W 88/06; H04W 76/15; H04B 17/345; H04L 5/001; H04L 5/003; H04L 5/0048; H04L 5/0055
See application file for complete search history.

(56) References Cited

U.S. PATENT DOCUMENTS

2012/0322455 A1 12/2012 Oh .................... H04W 72/048
455/450
2017/0048839 A1 2/2017 Henttonen et al.
(Continued)

FOREIGN PATENT DOCUMENTS

JP 2019510652 A 4/2019
JP 2020501385 A 1/2020
(Continued)

OTHER PUBLICATIONS

"3rd Generation Partnership Project; Technical Specification Group Radio Access Networks; Dual connectivity (DC) band combinations of LTE 1DL/1UL + one NR band (Release 15)", 3GPP TR 37.863-01-01 V0.2.0 (Oct. 2017).
(Continued)

*Primary Examiner* — Phuc H Tran
(74) *Attorney, Agent, or Firm* — Dentons US LLP

(57) ABSTRACT

Provided is a method for transmitting and receiving a signal by a terminal supporting dual-connectivity between evolved universal terrestrial radio access (E-UTRA) and new radio (NR). In the method, when the E-UTRA uses at least one of E-UTRA operating bands 1, 3, 5, and 7, when the NR uses one of NR operating bands n77, n78, and n79, when an uplink center frequency of a first operating band among the E-UTRA operating bands and the NR operating bands is a first value, and when a downlink center frequency of the first operating band is a second value, a predetermined maximum (Continued)

sensitivity degradation (MSD) is applied to reference sensitivity used for reception of the downlink signal.

14 Claims, 15 Drawing Sheets

Related U.S. Application Data

(60) Provisional application No. 62/585,561, filed on Nov. 14, 2017.

(56) References Cited

U.S. PATENT DOCUMENTS

| | | | |
|---|---|---|---|
| 2017/0318587 A1 | 11/2017 | Lim | H04L 5/001 |
| 2018/0091186 A1 | 3/2018 | Lim | H04B 1/005 |
| 2018/0278283 A1 | 9/2018 | Lim | H03H 1/00 |
| 2019/0158137 A1* | 5/2019 | Brunel | H04B 1/04 |
| 2019/0199316 A1* | 6/2019 | Houlden | H03H 9/542 |
| 2019/0326885 A1* | 10/2019 | Houlden | H01L 29/2003 |
| 2019/0394000 A1* | 12/2019 | Kim | H04L 5/0053 |

FOREIGN PATENT DOCUMENTS

| | | |
|---|---|---|
| KR | 10-2015-0050957 A | 5/2015 |
| KR | 10-2017-0021201 A | 2/2017 |
| WO | 2015/066476WO A1 | 5/2015 |

OTHER PUBLICATIONS

"3rd Generation Partnership Project; Technical Specification Group Radio Access Networks; Dual connectivity (DC) band combinations of LTE 2DL/1UL + one NR band (Relearse 15)", 3GPP TR 37.863-02-01 V0.2.0 (Oct. 2017).

LG Electronics, "MSD analysis for NSA DC UE at sub-6GHz", 3GPP TSG RAN WG4 #84BIS meeting, Oct. 9-13, 2017, R4-1710724.
China Telecom, "TP on TR 37.863-01-01 for DC_5A-n78A", 3GPP TSG-RAN WG4 Meeting #84bis, Oct. 9-13, 2017, R4-1710233.
NTT DoCoMo, Inc., "TP for TR 37.863-02-01 3DL/2UL DC_1A-3A-n79A", 3GPP TSG-RAN Working Group 4 (Radio) meeting #84bis, Aug. 9-13, 2017, R4-1710978.
NTT DoCoMo, Inc., "TP for TR 37.863-02-01 3DL/2UL DC_1A-3A-n77A", 3GPP TSG-RAN Working Group 4 (Radio) meeting #84bis, Oct. 9-13, 2017, R4-1711077.
LG Electronics, "WF on MSD analysis for LTE-NR DC UE", 3GPP TSG-RAN WG4 #84BIS Meeting, Oct. 9-13, 2017, R4-1711578.
China Telecom, "TP for TR 37.863-01-01 for DC_5A-n78A", 3GPP TSG-RAN WG4 Meeting #84bis, Oct. 9-13, 2017, R4-1710574.
China Telecom, LG Uplus, "TP for TR 37.863-02-01 DC_1A-5A-n78A", 3GPP TSG RAN WG4 Meeting #84bis, Oct. 9-13, 2017, R4-1710630.
NTT DoCoMo, Inc., "TP for TR 37.863-02-01 3DL/2UL DC_1A-3A-n78A", 3GPP TSG-RAN Working Group 4 (Radio) meeting #84bis, Oct. 9-13, 2017, R4-1710964.
NTT Docomo, Inc.: "UE category and RF band combination for LTE-NR Dual Connectivity", R2-1704189, 3GPP TSG RAN WG2 Meeting #98, Hangzhou, China, May 15-19, 2017.
LG Electronics, "MSD analysis for 3DL/2UL NSA DC UE at sub-6GHz", 3GPP TSG RAN WG4 #85 meeting, Nov. 27-Dec. 1, 2017, R4-1713218.
NTT DoCoMo, Inc., "TP for 37.863-02-01 MSD for DC including Band n77, n78 and n79", 3GPP TSG-RAN WG4 Meeting #85, Nov. 27-Dec. 1, 2017, R4-1712822.
"3rd Generation Partnership Project; Technical Specification Group Radio Access Networks; Dual connectivity (DC) band combinations of LTE 2DL/1UL + one NR band (Release 15)", 3GPP TR 37.863-02-01 V0.4.0 (Jan. 2018), R4-1800448.
LG Uplus, "TP for TR 37.863-02-01 DC_5A-7A-n78A", 3GPP TSG-RAN Working Group 4 (Radio) meeting AH#3, Sep. 18-21, 2017, R4-1709681.

* cited by examiner

METHOD FOR TRANSMITTING AND RECEIVING SIGNAL BY TERMINAL SUPPORTING DUAL-CONNECTIVITY BETWEEN E-UTRA AND NR AND TERMINAL PERFORMING THE METHOD

This application is a continuation application of U.S. patent application Ser. No. 16/317,071 filed on Jan. 11, 2019, which is a National Stage Entry of International Application No. PCT/KR2018/012047 filed on Oct. 12, 2018, and claims priority to U.S. Provisional Application No. 62/585,561 filed on Nov. 14, 2017, all of which are hereby incorporated by reference in their entireties as if fully set forth herein.

BACKGROUND OF THE INVENTION

Field of the Invention

The present invention relates to mobile communication.

Related Art

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly The $5^{th}$-generation mobile telecommunications defined by the International Telecommunication Union (ITU) refers to providing a data transfer rate of up to 20 Gbps and a perceptible transfer rate of at least 100 Mbps anywhere. The $5^{th}$-generation mobile telecommunications, whose official name is 'IMT-2020', is aimed to be commercialized worldwide in 2020.

ITU proposes three usage scenarios, for example, enhanced mobile broadband (eMBB), massive machine type communication (mMTC), and ultra-reliable and low latency communications (URLLC).

First, URLLC relates to a usage scenario which requires high reliability and low latency. For example, services such as autonomous driving, factory automation, augmented reality require high reliability and low latency (e.g., a delay time of 1 ms or less). Currently, latency of 4G (LTE) is statistically 21 to 43 ms (best 10%) and 33 to 75 ms (median). This is not enough to support a service requiring latency of 1 ms or less.

Next, the eMBB usage scenario refers to a usage scenario requiring mobile ultra-wideband. This ultra-wideband high-speed service is unlikely to be accommodated by core networks designed for existing LTE/LTE-A. Thus, in the so-called $5^{th}$-generation mobile communication, core networks are urgently required to be re-designed.

Meanwhile, in the 5th generation mobile communication, a scheme (EN-DC) of dually connecting LTE and NR is underway to ensure communication stability. However, in a state in which a downlink carrier using LTE and a downlink carrier using NR are aggregated, transmission of an uplink signal may cause a harmonic component and an intermodulation distortion (IMD) component to impact on a downlink band of a terminal itself.

SUMMARY OF THE INVENTION

In an aspect, provided is a method for transmitting and receiving a signal by a terminal supporting dual-connectivity between evolved universal terrestrial radio access (E-UTRA) and new radio (NR). The method may comprise transmitting an uplink signal using dual-connectivity between the E-UTRA and the NR; and receiving a downlink signal using the dual-connectivity, wherein the E-UTRA uses at least one of E-UTRA operating bands 1, 3, 5, and 7, wherein the NR uses one of NR operating bands n77, n78, and n79, wherein when an uplink center frequency of a first operating band among the E-UTRA operating bands and the NR operating bands is a first value, and a downlink center frequency of the first operating band is a second value, a predetermined maximum sensitivity degradation (MSD) is applied to reference sensitivity used for reception of the downlink signal, and wherein when the E-UTRA uses the E-UTRA operating bands 1 and 3, the NR uses the NR operating band n77, the first operating band is the E-UTRA operating band 3, the first value 1712.5 MHz, and the second value is 1807.5 MHz, the MSD value is 31.5 dB.

In another aspect, provided is also a terminal supporting dual-connectivity between evolved universal terrestrial radio access (E-UTRA) and new radio (NR). The terminal may comprise a transceiver transmitting an uplink signal and receiving a downlink signal using the dual-connectivity; and a processor controlling the transceiver, wherein the E-UTRA uses at least one of E-UTRA operating bands 1, 3, 5, and 7, wherein the NR uses one of NR operating bands n77, n78, and n79, wherein an uplink center frequency of a first operating band among the E-UTRA operating bands and the NR operating bands is a first value, and a downlink center frequency of the first operating band is a second value, a predetermined maximum sensitivity degradation (MSD) is applied to reference sensitivity used for reception of the downlink signal.

When the E-UTRA uses the E-UTRA operating band 5, the NR uses the NR operating band n78, the first operating band is the E-UTRA operating band 5, the first value is 844 MHz, and the second value is 889 MHz, the MSD value is 8.3 dB.

When the E-UTRA uses the E-UTRA operating bands 1 and 3, the NR uses the NR operating band n77, the first operating band is the E-UTRA operating band 3, the first value is 1712.5 MHz, and the second value is 1807.5 MHz, the MSD value is 31.5 dB.

When the E-UTRA uses the E-UTRA operating bands 1 and 3, the NR uses the NR operating band n77, the first operating band is the E-UTRA operating band 1, the first value is 1950 MHz, and the second value is 2140 MHz, the MSD value is 31.0 dB.

When the E-UTRA uses the E-UTRA operating bands 1 and 3, the NR uses the NR operating band n78, the first operating band is the E-UTRA operating band 3, the first value is 1712.5 MHz, and the second value is 1807.5 MHz, the MSD value is 31.2 dB.

When the E-UTRA uses the E-UTRA operating bands 5 and 7, the NR uses the NR operating band n78, the first operating band is the E-UTRA operating band 7, the first value is 2525 MHz, and the second value is 2645 MHz, the MSD value is 30.1 dB.

When the E-UTRA uses the E-UTRA operating bands 5 and 7, the NR uses the NR operating band n78, the first operating band is the E-UTRA operating band 5, the first value is 834 MHz, and the second value is 879 MHz, the MSD value is 30.2 dB.

When the E-UTRA uses the E-UTRA operating bands 1 and 5, the NR uses the NR operating band n78, the first operating band is the E-UTRA operating band 1, the first value is 1932 MHz, and the second value is 2122 MHz, the MSD value is 18.1 dB.

When the E-UTRA uses the E-UTRA operating bands 1 and 3, the NR uses the NR operating band n77, the first operating band is the E-UTRA operating band 3, the first value is 1775 MHz, and the second value is 1870 MHz, the MSD value is 8.5 dB.

When the E-UTRA uses the E-UTRA operating bands 1 and 7, the NR uses the NR operating band n78, the first operating band is the E-UTRA operating band 7, the first value is 2507.5 MHz, and the second value is 2627.5 MHz, the MSD value is 9.1 dB.

When the E-UTRA uses the E-UTRA operating bands 1 and 3, the NR uses the NR operating band n78, the first operating band is the E-UTRA operating band 1, the first value is 1935 MHz, and the second value is 2125 MHz, the MSD value is 2.8 dB.

When the E-UTRA uses the E-UTRA operating bands 1 and 3, the NR uses the NR operating band n79, the first operating band is the E-UTRA operating band 1, the first value is 1950 MHz, and the second value is 2140 MHz, the MSD value is 3.6 dB.

When the E-UTRA uses the E-UTRA operating bands 1 and 5, the NR uses the NR operating band n78, the first operating band is the E-UTRA operating band 5, the first value is 840 MHz, and the second value is 885 MHz, the MSD value is 3.1 dB.

When the E-UTRA uses the E-UTRA operating bands 5 and 7, the NR uses the NR operating band n78, the first operating band is the E-UTRA operating band 5, the first value is 830 MHz, and the second value is 875 MHz, the MSD value is 3.3 dB.

According to a disclosure of the present invention, the above problem of the related art is solved.

DESCRIPTION OF EXEMPLARY EMBODIMENTS

Figure 1:
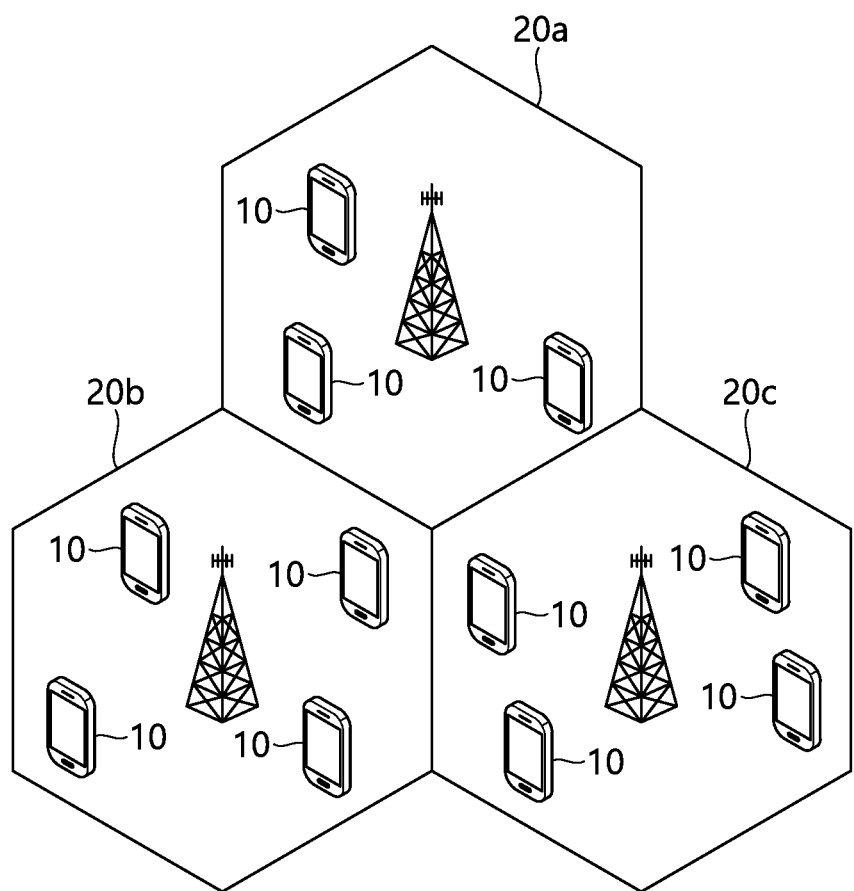
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
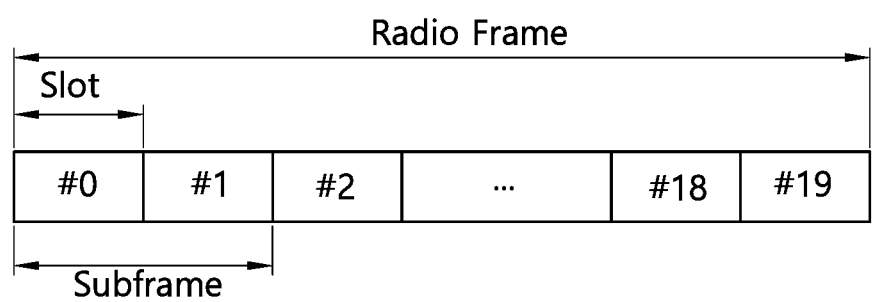
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
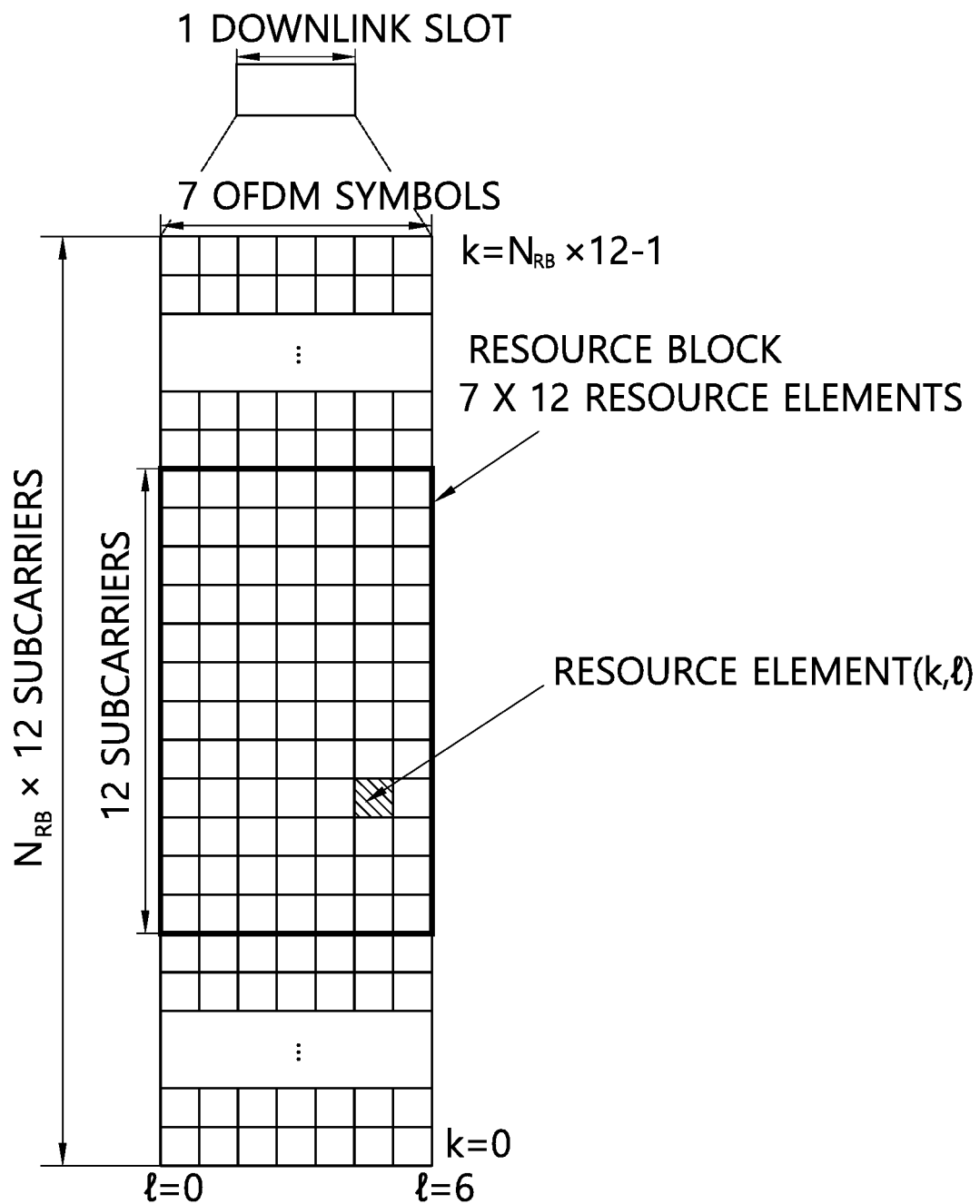
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
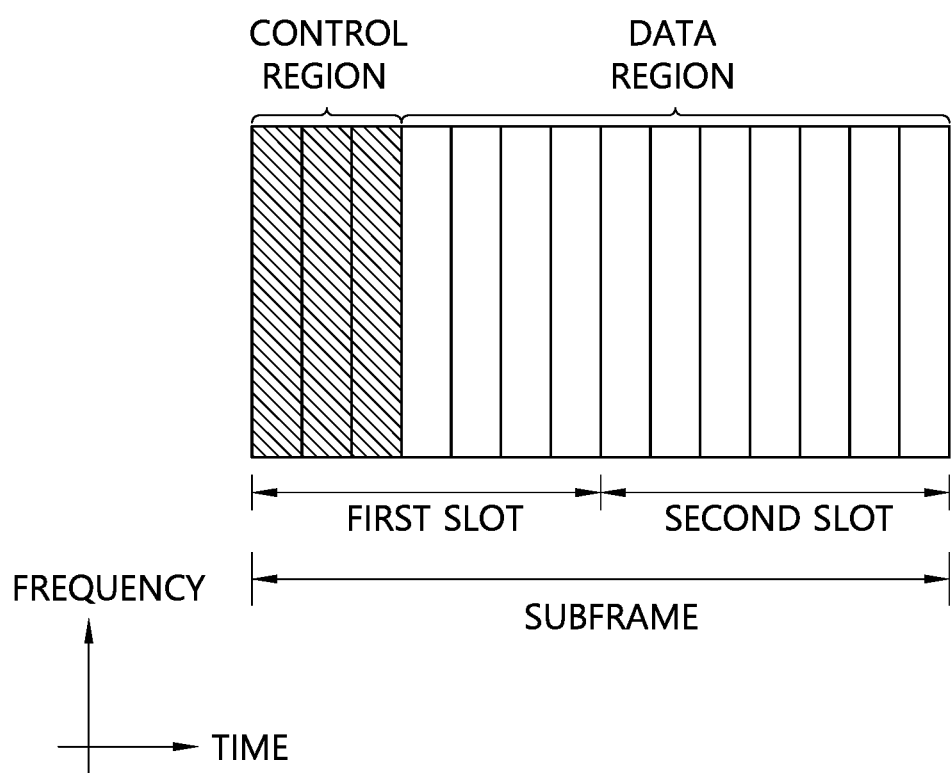
FIG. 4 illustrates the architecture of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
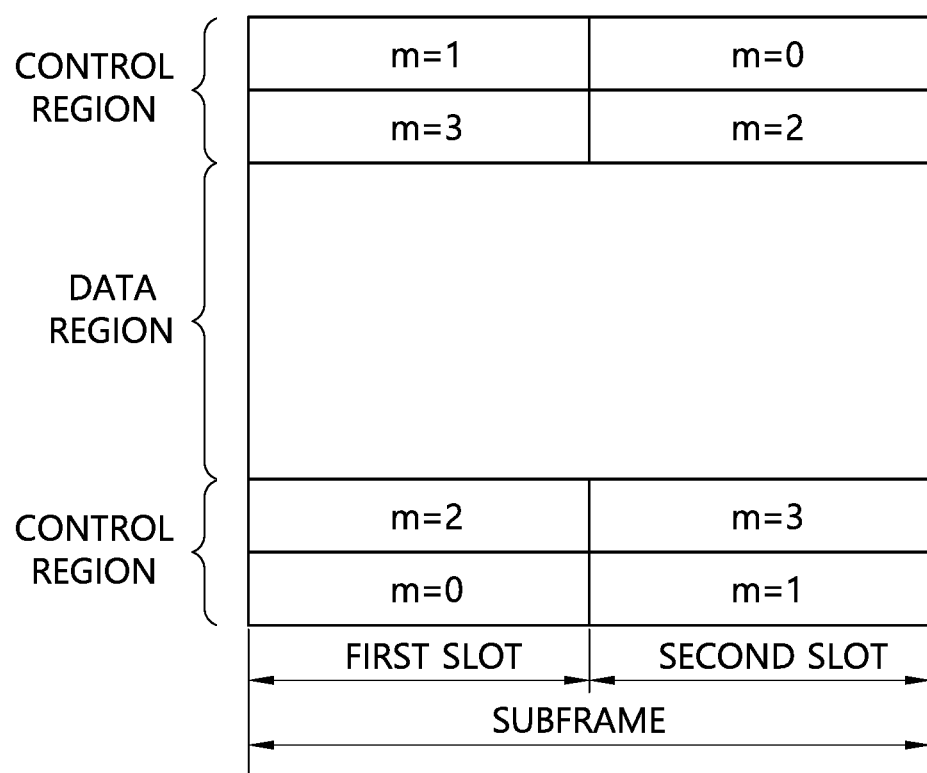
FIG. 5 illustrates the architecture of an uplink subframe in 3GPP LTE.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data.

The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

Meanwhile, the carrier aggregation (CA) technologies, as described above, may be generally separated into an inter-band CA technology and an intra-band CA technology. The inter-band CA is a method that aggregates and uses CCs that are present in different bands from each other, and the intra-band CA is a method that aggregates and uses CCs in the same frequency band. Further, CA technologies are more specifically split into intra-band contiguous CA, intra-band non-contiguous CA, and inter-band non-contiguous CA.

Figure 6A:
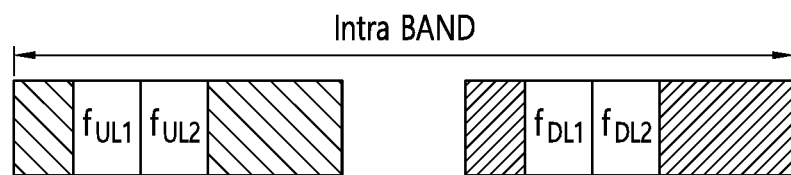
FIGS. 6A and 6B are conceptual views illustrating intra-band carrier aggregation (CA).
Figure 6B:
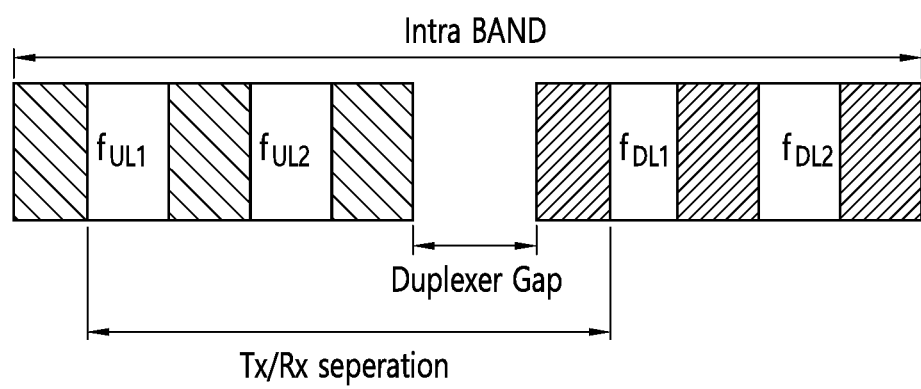

FIGS. 6A and 6B are concept views illustrating intra-band carrier aggregation (CA).

FIG. 6A illustrates intra-band contiguous CA, and FIG. 6B illustrates intra-band non-contiguous CA.

LTE-advanced adds various schemes including uplink MIMO and carrier aggregation in order to realize high-speed wireless transmission. The CA that is being discussed in LTE-advanced may be split into the intra-band contiguous CA shown in FIG. 6A and the intra-band non-contiguous CA shown in FIG. 6B.

Figure 7A:
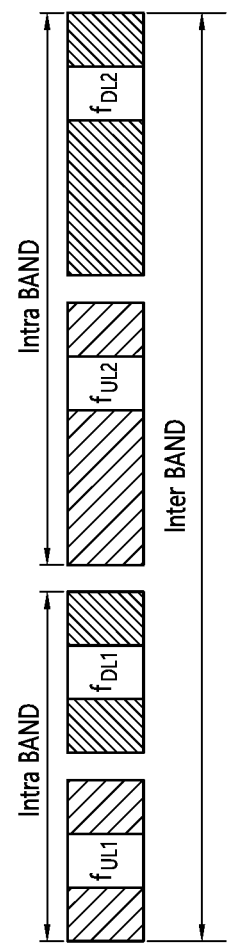
FIGS. 7A and 7B are conceptual views illustrating inter-band carrier aggregation (CA).
Figure 7B:
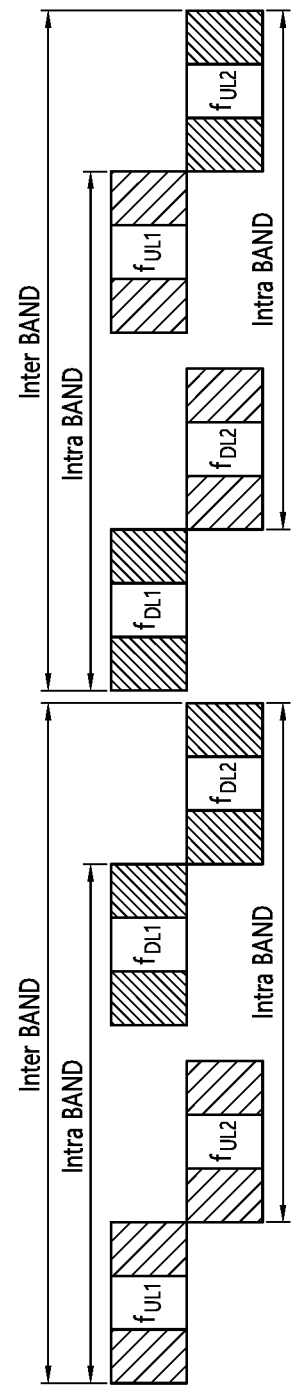

FIGS. 7A and 7B are concept views illustrating inter-band carrier aggregation.

FIG. 7A illustrates a combination of a lower band and a higher band for inter-band CA, and FIG. 7B illustrates a combination of similar frequency bands for inter-band CA.

In other words, the inter-band carrier aggregation may be separated into inter-band CA between carriers of a low band and a high band having different RF characteristics of inter-band CA as shown in FIG. 7A and inter-band CA of similar frequencies that may use a common RF terminal per component carrier due to similar RF (radio frequency) characteristics as shown in FIG. 7B.

TABLE 1

| Operating Band | Uplink (UL) operating band FUL_low-FUL_high | Downlink (DL) operating band FDL_low-FDL_high | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A N/A | 1452 MHz-1496 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

TABLE 2

| Operating Band | Uplink (UL) operating band FUL_low-FUL_high | Downlink (DL) operating band FDL_low-FDL_high | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

When operating bands are fixed as illustrated in Table 1 and Table 2, a frequency allocation organization of each country may assign a specific frequency to a service provider according to a situation of each country.

Meanwhile, in the current 5G NR technology, a scheme (EN-DC) of dually connecting LTE and NR is underway to ensure communication stability. However, in a state in which a downlink carrier using LTE and a downlink carrier using NR are aggregated, transmission of an uplink signal may cause a harmonic component and an intermodulation distortion (IMD) component to impact on a downlink band of the UE itself.

Specifically, the UE must be set to satisfy a reference sensitivity power level (REFSENS), which is minimum average power for each antenna port of the UE. However, in case that the harmonic component and/or the IMD component occurs, the REFSENS for the downlink signal may not be satisfied. That is, the REFSENS must be set such that throughput thereof is at least 95% of maximum throughput of a reference measurement channel, but the occurrence of the harmonic component and/or the IMD component may cause the throughput to fall below 95%.

Thus, it is determined whether the harmonic component and/or the IMD component of the EN-DC terminal (or EN-DC user equipment (UE)) has occurred, and when the harmonic component and the IMD component of the EN-DC terminal has occurred, a maximum sensitivity degradation (MSD) value for a corresponding frequency band may be defined to allow relaxation for the REFSENS in a reception band of the EN-DC terminal based on a transmission signal of the EN-DC terminal. Here, the MSD is maximum allowable degradation of REFSENS, and in a certain frequency band, the REFSENS may be relaxed by the defined amount of MSD.

Accordingly, in the present disclosure, an MSD value for eliminating (or reducing) the harmonic component and IMD is proposed for a terminal set to aggregate two or more downlink carriers and two uplink carriers.

<Disclosure of Present Specification>

Hereinafter, in case that the UE transmits an uplink signal through two uplink carriers in an aggregation state of a plurality of downlink carriers and two uplink carriers, whether an interference is leaked to a downlink band of the UE is analyzed and a solution thereto is subsequently proposed.

Figure 8:
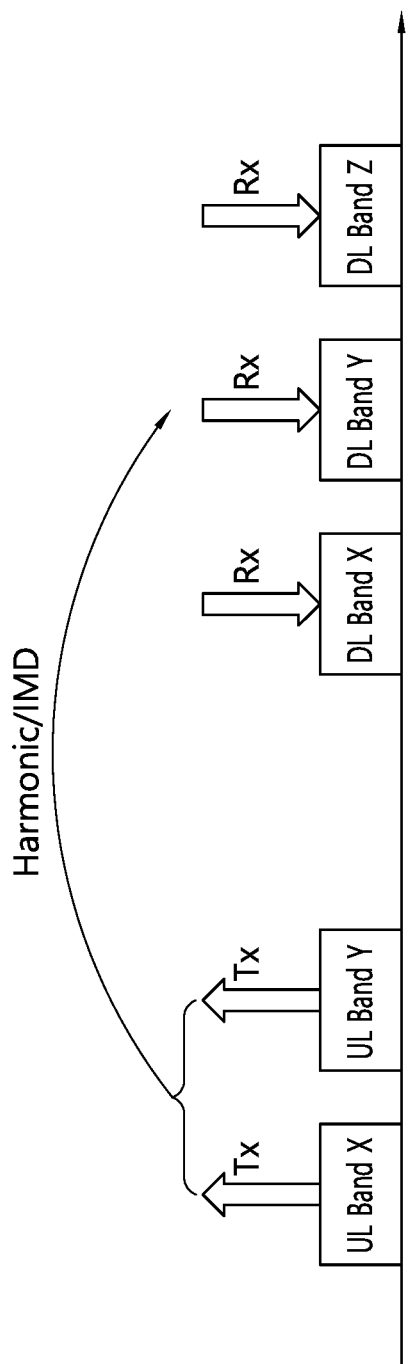
FIG. 8 illustrates a situation where a harmonic component and intermodulation distortion (IMD) are introduced into downlink band when uplink signal is transmitted through two uplink carriers.

FIG. 8 illustrates a situation where an uplink signal transmitted through an uplink band flows into an uplink band of the UE.

Referring to FIG. 8, in a state in which three downlink bands are set by carrier aggregation and two uplink bands are set, when the UE transmits an uplink signal through two uplink bands, the harmonic component and the IMD component may be introduced into a downlink band of the UE. In this situation, an MSD value capable of correcting the REFSENS is proposed to prevent reception sensitivity of a downlink signal from deteriorating due to the harmonic component and/or the IMD component.

In addition, although the UE appropriately solves the problem, a degradation of a reception sensitivity level in the downlink band of the UE may not be completely prevented due to cross isolation and coupling loss due to the PCB, a scheme of alleviating the requirements that an existing UE must meet.

Figure 9:
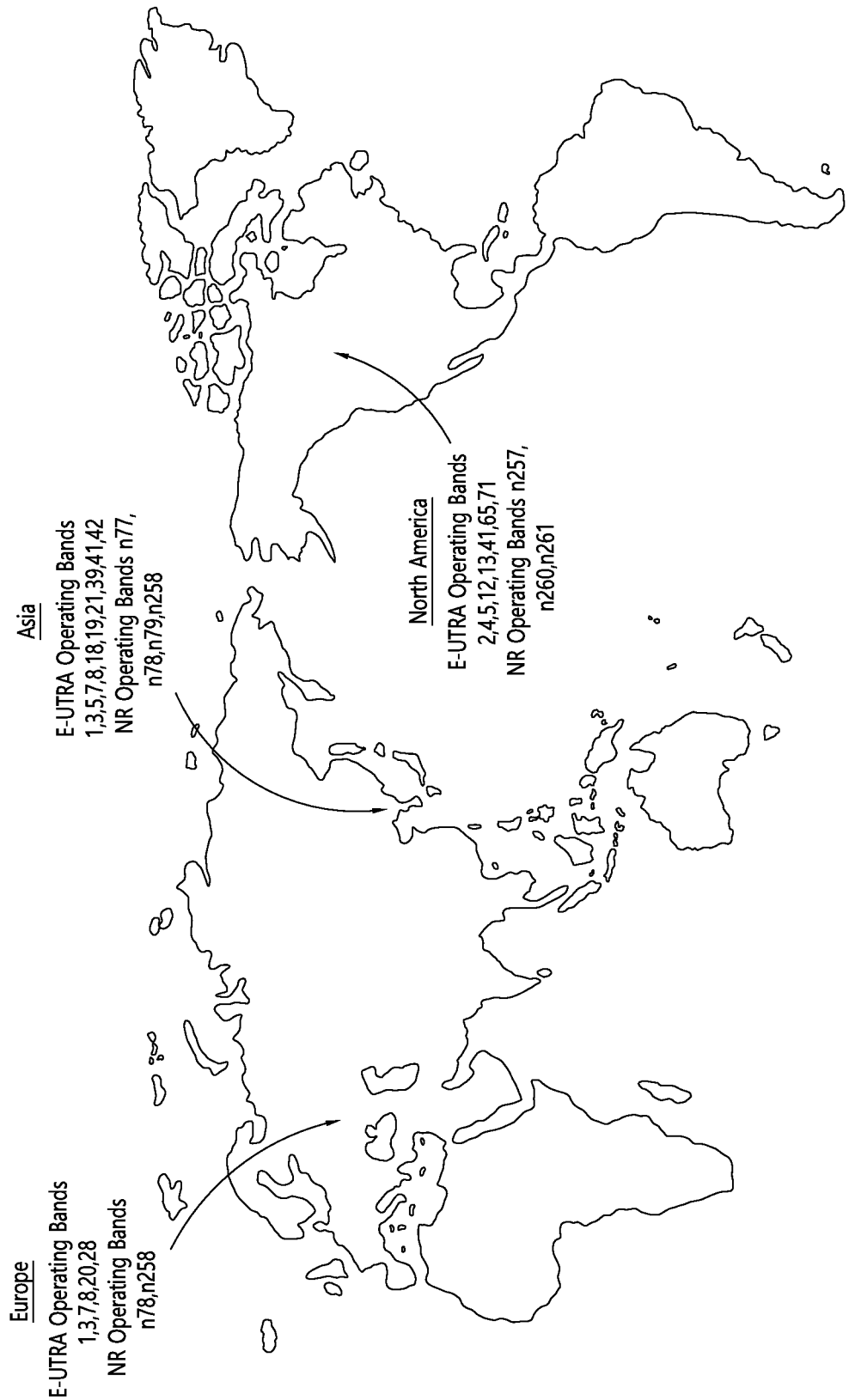
FIG. 9 illustrates an example of operating bands used in each continent.

FIG. 9 illustrates an example of operating bands used in each continent.

As illustrated in FIG. 9, in Europe, bands 1, 3, 7, 8, 20 and 28, among the E-UTRA operating bands according to Table 1, and bands n78 and n258, among the NR operating bands according to Table 2, may be used. In Asia, bands 1, 3, 5, 7, 8, 18, 19, 21, 39, 41, and 42, among the E-UTRA operating bands according to Table 1, and bands n77 and n78, n79, and n258, the NR operating bands according to Table 2, may be used. In North America, bands 2, 4, 5, 12, 13, 41, 65 and 71, among the E-UTRA operating bands according to Table 1, and bands n257, n260, and n261, among the NR operating bands according to Table 2, may be used.

Details of the used frequency bands illustrated in FIG. 9 are summarized in Table 3 below.

TABLE 3

|  |  | Europe | Asia | North America |
|---|---|---|---|---|
| E-UTRA Operating band | 1 | ○ | ○ |  |
|  | 2 |  |  | ○ |
|  | 3 | ○ | ○ |  |
|  | 4 |  |  | ○ |
|  | 5 |  | ○ | ○ |
|  | 7 | ○ | ○ |  |
|  | 8 | ○ | ○ |  |
|  | 12 |  |  | ○ |
|  | 13 |  |  | ○ |
|  | 18 |  | ○ |  |
|  | 19 |  | ○ |  |
|  | 20 | ○ |  |  |
|  | 21 |  | ○ |  |
|  | 28 | ○ |  |  |
|  | 39 |  | ○ |  |
|  | 41 |  | ○ | ○ |
|  | 42 |  | ○ |  |
|  | 65 |  |  | ○ |
|  | 71 |  |  | ○ |
| NR Operating band | n77 |  | ○ |  |
|  | n78 | ○ | ○ |  |
|  | n79 |  | ○ |  |
|  | n257 |  |  | ○ |
|  | n258 | ○ | ○ |  |
|  | n260 |  |  | ○ |
|  | n261 |  |  | ○ |

Referring to FIGS. 9 and 3, different frequency bands are used in each continent (region). In some cases, some frequency bands may be commonly used in each continent. For example, the E-UTRA operating bands 1, 3, 7, and 8 are frequency bands commonly used in Europe and Asia, and E-UTRA operating bands 5 and 41 are frequency bands commonly used in Asia and North America.

Meanwhile, the frequency bands used in each continent (region) are not limited to FIG. 9 and Table 3. That is, a frequency band not shown in FIG. 9 and Table 3 may also be used in each continent (region).

I. First Disclosure

In the first disclosure, an MSD level for a 2DL/2UL dual connectivity (DC) band combination at 6 GHz or lower is proposed. In particular, in the first disclosure, an MSD level according to an IMD for the following band combinations is proposed.

4th IMD:DC_5A-n78A, DC_8A-n78A, DC_26A-n78A
5th IMD:DC_28A-n78A

The first disclosure provides an MSD value for supporting a DC operation when self-interference affects a reception frequency band thereof.

For NR, a shared antenna RF architecture for non-standalone (NSA) terminals of 6 GHz or lower, like an LTE systems, may be considered. Thus, a shared antenna RF architecture for a generic NSA DC terminal may be considered to derive the MSD level. However, some DC band combinations for the NR DC terminal must consider a separate RF architecture which means a case where the operating frequency range between the NR band and the LTE band overlap, like DC_42A-n77A, DC_42A-n78A and DC_41_n41A.

1. IMD Problem in LTE Band

Based on the coexistence analysis results for the NSA DC terminal, the MSD level for the following two cases may be determined.

4th IMD:DC_5A-n78A, DC_8A-n78A, DC_26A-n78A
5th IMD:DC_28A-n78A

2. MSD Value Based on IMD

Table 4 shows the UE RF front-end component parameters for deriving MSD levels at 6 GHz or lower.

TABLE 4

UE ref. architecture
Cascaded Diplexer Architecture
DC_5A-n78A, DC_8A-n78A, DC_26A-n78A, DC_28A-n78A

| Component | IP2 (dBm) | IP3 (dBm) | IP4 (dBm) | IP5 (dBm) |
|---|---|---|---|---|
| Ant. Switch | 112 | 68 | 55 | 55 |
| Diplexer | 115 | 87 | 55 | 55 |
| Duplexer | 100 | 75 | 55 | 53 |
| PA Forward | 28.0 | 32 | 30 | 28 |
| PA Reversed | 40 | 30.5 | 30 | 30 |
| LNA | 10 | 0 | 0 | −10 |

Table 5 shows an isolation level according to RF components.

TABLE 5

| Isolation Parameter | Value (dB) | Comment |
|---|---|---|
| Antenna to Antenna | 10 | Main antenna to diversity antenna |
| PA (out) to PA (in) | 60 | PCB isolation (PA forward mixing) |
| Diplexer | 25 | High/low band isolation |
| PA (out) to PA (out) | 60 | L-H/H-L cross-band |
| PA (out) to PA (out) | 50 | H-H cross-band |
| LNA (in) to PA (out) | 60 | L-H/H-L cross-band |
| LNA (in) to PA (out) | 50 | H-H cross-band |
| Duplexer | 50 | Tx band rejection at Rx band |

Here, the isolation level indicates how much the intensity of a signal is reduced at the corresponding frequency when passing through an element or an antenna. For example, referring to Table 5, when the signal is transmitted from an antenna to an antenna, strength thereof may be reduced by 10 dB, and when a signal is received at the corresponding frequency, strength thereof may be reduced by 50 dB and transmitted.

Based on Table 4 and Table 5, the present disclosure proposes MSD levels as shown in Table 6 and Table 7. Table 6 shows the proposed MSD for solving the 4th IMD, and Table 7 shows the proposed MSD for solving the 5th IMD.

TABLE 6

| DC bands | UL DC | IMD | IMD | UL Fc (MHz) | UL BW (MHz) | UL RB # | DL Fc (MHz) | DL BW (MHz) | CF (dB) | MSD (dB) |
|---|---|---|---|---|---|---|---|---|---|---|
| DC_5A-n78A | 5 | IMD4 | |fB78 − | 844 | 5 | 25 | 889 | 5 | 1.3 | 8.3 |
|  | n78 |  | 3*fB5| | 3421 | 10 | 52 | 3421 | 10 |  | N/A |
| DC_8A-n78A | 8 | IMD4 | |fB78 − | 910 | 5 | 25 | 955 | 5 | 1.3 | 8.4 |
|  | n78 |  | 3*fB3| | 3685 | 10 | 52 | 3685 | 10 |  | N/A |
| DC_26A-n78A | 26 | IMD4 | |fB78 − | 819 | 5 | 25 | 864 | 5 | 1.7 | 9.0 |
|  | n78 |  | 3*fB26| | 3321 | 10 | 52 | 3321 | 10 |  | N/A |

TABLE 7

| DC bands | UL DC | IMD | IMD | UL Fc (MHz) | UL BW (MHz) | UL RB # | DL Fc (MHz) | DL BW (MHz) | CF (dB) | MSD (dB) |
|---|---|---|---|---|---|---|---|---|---|---|
| DC_28A-n78A | 28 | IMD5 | |fB78 − | 733 | 5 | 25 | 788 | 5 | 0.7 | 3.2 |
|  | n78 |  | 4*fB28| | 3720 | 10 | 52 | 3720 | 10 |  | N/A |

Based on the test settings and proposed MSD levels set forth in Table 6 and Table 7, the first disclosure proposes as follows.

Proposal 1: The proposed test configuration and MSD levels must be considered to meet the requirements for the MSD.

II. Second Disclosure

In the second disclosure, MSD levels for a 3DL/2UL DC band combination of 6 GHz or lower are proposed. The DC band combination of 6 GHz or lower, which needs to be reviewed to solve the self-interference problem, is as follows.

TABLE 8

| E-UTRA Band/Channel bandwidth/NRB/Duplex mode | | | | | | | | | |
|---|---|---|---|---|---|---|---|---|---|
| EUTRA/NR DC | | | | | | | | | |
| DL configuration | UL configuration | EUTRA/ NR band | UL Fc (MHz) | UL/DL BW (MHz) | UL CLRB | DL Fc (MHz) | MSD (dB) | Duplex mode | Source of IMD | NOTE |
|---|---|---|---|---|---|---|---|---|---|---|
| DC_1A-3A-n77A | DC_1A-n77A | 1 | 1950 | 5 | 25 | 2140 | N/A | FDD | N/A |  |
|  |  | 3 | 1712.5 | 5 | 25 | 1807.5 | TBD |  | IMD2 | Case 2 |
|  |  | n77 | 3757.5 | 10 | 52 | 3757.5 | N/A | TDD | N/A |  |
|  | DC_1A-n77A | 1 | 1950 | 5 | 25 | 2140 | N/A | FDD | N/A |  |
|  |  | 3 | 1775 | 5 | 25 | 1870 | TBD |  | IMD4 | Case 9 |
|  |  | n77 | 3980 | 10 | 52 | 3980 | N/A | TDD | N/A |  |
|  | DC_3A-n77A | 1 | 1950 | 5 | 25 | 2140 | TBD | FDD | IMD2 | Case 1 |
|  |  | 3 | 1775 | 5 | 25 | 1870 | N/A |  | N/A |  |
|  |  | n77 | 3915 | 10 | 52 | 3915 | N/A | TDD | N/A |  |
| DC_1A-3A-n78A | DC_1A-n78A | 1 | 1950 | 5 | 25 | 2140 | N/A | FDD | N/A |  |
|  |  | 3 | 1712.5 | 5 | 25 | 1807.5 | TBD |  | IMD2 | Case 2 |
|  |  | n78 | 3757.5 | 10 | 52 | 3757.5 | N/A | TDD | N/A |  |
|  | DC_3A-n78A | 1 | 1950 | 5 | 25 | 2140 | TBD | FDD | IMD5 | Case 14 |
|  |  | 3 | 1775 | 5 | 25 | 1870 | N/A |  | N/A |  |
|  |  | n78 | 3725 | 10 | 52 | 3725 | N/A | TDD | N/A |  |
| DC_1A-3A-n79A | DC_3A-n79A | 1 | 1950 | 5 | 25 | 2140 | TBD | FDD | IMD5 | Case 15 |
|  |  | 3 | 1775 | 5 | 25 | 1870 | N/A |  | N/A |  |
|  |  | n79 | 4860 | 40 | 216 | 4860 | N/A | TDD | N/A |  |
| DC_1A-19A-n77A | DC_19A-n77A | 1 | 1940 | 5 | 25 | 2130 | TBD | FDD | IMD3 | Case 4 |
|  |  | 19 | 832.5 | 5 | 25 | 877.5 | N/A |  | N/A |  |
| DC_1A-19A-n78A | DC_19A-n78A | n77, n78 | 3795 | 10 | 52 | 3795 | N/A | TDD | N/A |  |
| DC_1A-19A-n79A | DC_1A-n79A | 1 | 1950 | 5 | 25 | 2140 | N/A | FDD | N/A |  |
|  |  | 19 | 837.5 | 5 | 25 | 882.5 | TBD |  | IMD3 | Case 5 |
|  |  | n79 | 4782.5 | 40 | 216 | 4782.5 | N/A | TDD | N/A |  |
|  | DC_19A-n79A | 1 | 1950 | 5 | 25 | 2140 | TBD | FDD | IMD4 | Case 10 |
|  |  | 19 | 837.5 | 5 | 25 | 882.5 | N/A |  | N/A |  |
|  |  | n79 | 4652.5 | 40 | 216 | 4652.5 | N/A | TDD | N/A |  |
| DC_1A-21A-n77A | DC_21A-n77A | 1 | 1964.6 | 5 | 25 | 2154.6 | TBD | FDD | IMD2 | Case 3 |
|  |  | 21 | 1450.4 | 5 | 25 | 1498.4 | N/A |  | N/A |  |
| DC_1A-21A-n78A | DC_21A-n78A | n77, n78 | 3605 | 10 | 52 | 3605 | N/A | TDD | N/A |  |
|  | DC_1A-n77A | 1 | 1950 | 5 | 25 | 2140 | N/A | FDD | N/A |  |
|  | DC_1A-n78A | 21 | 1452 | 5 | 25 | 1500 | TBD |  | IMD5 | Case 16 |
|  |  | n77, n78 | 3675 | 10 | 52 | 3675 | N/A | TDD | N/A |  |
| DC_3A-19A-n79A | DC_3A-n79A | 3 | 1775 | 5 | 25 | 1870 | N/A | FDD | N/A |  |
|  |  | 19 | 840 | 5 | 25 | 885 | TBD |  | IMD3 | Case 6 |
|  |  | n79 | 4435 | 40 | 216 | 4435 | N/A | TDD | N/A |  |
|  | DC_19A-n79A | 3 | 1782.5 | 5 | 25 | 1877.5 | TBD | FDD | IMD4 | Case 11 |
|  |  | 19 | 842.5 | 5 | 25 | 887.5 | N/A |  | N/A |  |
|  |  | n79 | 4420 | 40 | 216 | 4420 | N/A | TDD | N/A |  |

TABLE 8-continued

E-UTRA Band/Channel bandwidth/NRB/Duplex mode

EUTRA/NR DC

| DL configuration | UL configuration | EUTRA/ NR band | UL Fc (MHz) | UL/DL BW (MHz) | UL CLRB | DL Fc (MHz) | MSD (dB) | Duplex mode | Source of IMD | NOTE |
|---|---|---|---|---|---|---|---|---|---|---|
| DC_3A-21A-n77A | DC_3A-n77A | 3 | 1767.5 | 5 | 25 | 1862.5 | N/A | FDD | N/A | |
| | | 21 | 1459.5 | 5 | 25 | 1507.5 | TBD | | IMD4 | Case 12 |
| DC_3A-21A-n78A | DC_3A-n78A | n77, n78 | 3795 | 10 | 52 | 3795 | N/A | TDD | N/A | |
| DC_3A-21A-n77A | DC_21A-n77A | 3 | 1771.6 | 5 | 25 | 1866.6 | TBD | FDD | IMD5 | Case 17 |
| | | 21 | 1450.4 | 5 | 25 | 1498.4 | N/A | | N/A | |
| | | n77 | 3935 | 10 | 52 | 3935 | N/A | TDD | N/A | |
| DC_3A-21A-n79A | DC_21A-n79A | 3 | 1774.2 | 5 | 25 | 1869.2 | TBD | FDD | IMD3 | Case 7 |
| | | 21 | 1450.4 | 5 | 25 | 1498.4 | N/A | | N/A | |
| | | n79 | 4770 | 40 | 216 | 4770 | N/A | TDD | N/A | |
| DC_19A-21A-n77A | DC_21A-n77A | 19 | 837.5 | 5 | 25 | 882.5 | TBD | FDD | IMD3 | Case 8 |
| | | 21 | 1450.4 | 5 | 25 | 1498.4 | N/A | | N/A | |
| DC_19A-21A-n78A | DC_21A-n78A | n77, n78 | 3783.3 | 10 | 52 | 3783.3 | N/A | TDD | N/A | |
| DC_19A-21A-n77A | DC_19A-n77A | 19 | 837.5 | 5 | 25 | 882.5 | N/A | FDD | N/A | |
| | | 21 | 1454.5 | 5 | 25 | 1502.5 | TBD | | IMD4 | Case 13 |
| | | n77 | 4015 | 10 | 52 | 4015 | N/A | TDD | N/A | |
| DC_19A-21A-n79A | DC_19A-n79A | 19 | 837.5 | 5 | 25 | 882.2 | N/A | FDD | N/A | |
| | | 21 | 1452 | 5 | 25 | 1500 | TBD | | IMD5 | Case 18 |
| | | n79 | 4850 | 40 | 216 | 4850 | N/A | TDD | N/A | |

In addition, some 3DL/2UL DC of following combinations may cause self-interference with respect to a third reception frequency band of their own.

2nd IMD:
3DL_DC_5A-7A-n78A w/ 2UL_DC_5A-n78A•2nd IMD into B7
3DL_DC_5A-7A-n78A w/ 2UL_DC_7A-n78A•2nd IMD into B5

3rd IMD:
3DL_DC_1A-5A-n78A w/ 2UL_DC_5A-n78A•3rd IMD into B1

4th IMD:
3DL_DC_1A-7A-n78A w/ 2UL_DC_1A-n78A•4th IMD into B7
3DL_DC_1A-7A-n78A w/ 2UL_DC_7A-n78A•4th IMD into B1

5th IMD:
3DL_DC_1A-5A-n78A w/ 2UL_DC_1A-n78A•5th IMD into B5
3DL_DC_5A-7A-n78A w/ 2UL_DC_7A-n78A•5th IMD into B5

In the case of 4DL/2UL DCs, the IMD problem may be solved in DC band combinations of a low frequency, like 3DL/2UL DC combo and 2DL/2UL DC combo. Therefore, the 4DL/2UL DC combination and the 5DL/2UL DC combination may not have the MSD problem like the LTE xDL/2UL CA band combination.

In order to support dual-connectivity between the NR band and the LTE E-UTRA band, it is necessary to analyze MSD values in the third reception frequency band according to self-interference. Thus, in the second disclosure, the MSD value in the 3DL/2UL NSA DC band combination is provided.

Regarding NR, a shared antenna RF architecture for non-standalone (NSA) terminals of 6 GHz or lower, such as LTE systems, may be considered. Thus, a shared antenna RF architecture for a generic NSA DC terminal may be considered to derive the MSD level. However, some DC band combinations for an NR DC terminal must consider a separate RF architecture which means a case where an operating frequency range between the NR band and the LTE band overlap like DC_42A-n77A, DC_42A-n78A, and DC_41_n41A.

1. IMD Problem in Third LTD Band

Based on the coexistence analysis results for the NSA DC terminal, the MSD levels for the following four cases may be determined. When the MSD levels are analyzed, a harmonic trap filter may be used.

2nd IMD:
3DL_DC_1A-3A-n77A w/ 2UL_DC_1A-n77A
3DL_DC_1A-3A-n77A w/ 2UL_DC_3A-n77A
3DL_DC_1A-3A-n78A w/ 2UL_DC_1A-n78A
3DL_DC_1A-21A-n77A w/ 2UL_DC_21A-n77A
3DL_DC_5A-7A-n78A w/ 2UL_DC_5A-n78A
3DL_DC_5A-7A-n78A w/ 2UL_DC_7A-n78A

3rd IMD:
3DL_DC_1A-19A-n77A w/ 2UL_DC_19A-n77A
3DL_DC_1A-19A-n79A w/ 2UL_DC_1A-n79A
3DL_DC_3A-19A-n79A w/ 2UL_DC_3A-n79A
3DL_DC_3A-21A-n79A w/ 2UL_DC_21A-n79A
3DL_DC_19A-21A-n77A w/ 2UL_DC_21A-n77A
3DL_DC_1A-5A-n78A w/ 2UL_DC_5A-n78A

4th IMD:
3DL_DC_1A-3A-n77A w/ 2UL_DC_1A-n77A
3DL_DC_1A-19A-n79A w/ 2UL_DC_19A-n79A
3DL_DC_3A-19A-n79A w/ 2UL_DC_19A-n79A
3DL_DC_3A-21A-n77A w/ 2UL_DC_3A-n77A
3DL_DC_19A-21A-n77A w/ 2UL_DC_19A-n77A
3DL_DC_1A-7A-n78A w/ 2UL_DC_1A-n78A
3DL_DC_1A-7A-n78A w/ 2UL_DC_7A-n78A

5th IMD:
3DL_DC_1A-3A-n78A w/ 2UL_DC_3A-n78A
3DL_DC_1A-3A-n79A w/ 2UL_DC_3A-n79A
3DL_DC_1A-21A-n77A w/ 2UL_DC_1A-n77A
3DL_DC_3A-21A-n77A w/ 2UL_DC_21A-n77A
3DL_DC_19A-21A-n79A w/ 2UL_DC_19A-n79A
3DL_DC_1A-5A-n78A w/ 2UL_DC_1A-n78A
3DL_DC_5A-7A-n78A w/ 2UL_DC_7A-n78A

2. MSD Value Based on IMD

Table 9 shows RF component isolation parameters for deriving the MSD level at 6 GHz lower. A shared antenna RF architecture for all DC band combinations in the list may be considered.

TABLE 9

UE ref. architecture
Triplexer-Diplexer or Triplexer-Quadplexer
Architecture
Triplexer-Quadplexer: DC__1A-3A-n77A,
DC__1A-3A-n78A, DC__1A-3A-n79A,
DC__3A-21A-n77A, DC__3A-21A-n79A
Triplexer-Diplexer: DC__1A-19A-n77A,
DC__1A-21A-n77A, DC__3A-19A-n79A,
DC__19A-21A-n77A, DC__19A-21A-n79A,
DC__1A-5A-n78A, DC__1A-7A-n78A, DC__5A-7A-n78A

| Component | IP2 (dBm) | IP3 (dBm) | IP4 (dBm) | IP5 (dBm) |
|---|---|---|---|---|
| Ant. Switch | 112 | 68 | 55 | 55 |
| Triplexer | 115 | 82 | 55 | 55 |
| Quadplexer | 110 | 72 | 55 | 52 |
| Diplexer | 115 | 87 | 55 | 55 |
| Duplexer | 100 | 75 | 55 | 53 |
| PA Forward | 28.0 | 32 | 30 | 28 |
| PA Reversed | 40 | 30.5 | 30 | 30 |
| LNA | 10 | 0 | 0 | −10 |

Table 10 shows isolation levels according to RF components.

TABLE 10

| Isolation Parameter | Value (dB) | Comment |
|---|---|---|
| Antenna to Antenna | 10 | Main antenna to diversity antenna |
| PA (out) to PA (in) | 60 | PCB isolation (PA forward mixing) |
| Triplexer | 20 | High/low band isolation |
| Quadplexer | 20 | L-L or H-M band isolation |
| Diplexer | 25 | High/low band isolation |
| PA (out) to PA (out) | 60 | L-H/H-L cross-band |
| PA (out) to PA (out) | 50 | H-H cross-band |
| LNA (in) to PA (out) | 60 | L-H/H-L cross-band |
| LNA (in) to PA (out) | 50 | H-H cross-band |
| Duplexer | 50 | Tx band rejection at Rx band |

Based on Table 9 and Table 10, MSD levels as shown in Table 11 to Table 14 are proposed.

Table 11 shows the MSD proposed to solve the second IMD, Table 12 shows the MSD proposed to solve the third IMD, Table 13 shows the MSD proposed to solve the fourth IMD, and Table 14 shows the MSD proposed to solve the fifth IMD.

TABLE 11

| DC bands | UL DC | IMD | | UL Fc (MHz) | UL BW (MHz) | UL RB # | DL Fc (MHz) | DL BW (MHz) | CF (dB) | MSD (dB) |
|---|---|---|---|---|---|---|---|---|---|---|
| DC__1A-3A-n77A | 1 | IMD2 | \|fB77 − fB1\| | 1950 | 5 | 25 | 2140 | 5 | 2.5 | N/A |
|  | n77 |  |  | 3757.5 | 10 | 52 | 3757.5 | 10 |  |  |
|  | 3 |  |  | 1712.5 | 5 | 25 | 1807.5 | 5 |  | 31.5 |
| DC__1A-3A-n77A | 3 | IMD2 | \|fB77 − fB3\| | 1775 | 5 | 25 | 1870 | 5 | 2.5 | N/A |
|  | n77 |  |  | 3915 | 10 | 52 | 3915 | 10 |  |  |
|  | 1 |  |  | 1950 | 5 | 25 | 2140 | 5 |  | 31.0 |
| DC__1A-3A-n78A | 1 |  | \|fB78 − fB1\| | 1950 | 5 | 25 | 2140 | 5 |  | N/A |
|  | n78 | IMD2 |  | 3757.5 | 10 | 52 | 3757.5 | 10 | 2.5 |  |
|  | 3 |  |  | 1712.5 | 5 | 25 | 1807.5 | 5 |  | 31.2 |
| DC__1A-21A-n77A | 21 |  | \|fB77 − fB21\| | 1450.4 | 5 | 25 | 1498.4 | 5 |  | N/A |
|  | n77 | IMD2 |  | 3605 | 10 | 52 | 3605 | 10 | 2.3 |  |
|  | 1 |  |  | 1964.6 | 5 | 25 | 2154.6 | 5 |  | 30.6 |
| DC__5A-7A-n78A | 5 |  | \|fB78 − fB5\| | 844 | 5 | 25 | 889 | 5 |  | N/A |
|  | n78 | IMD2 |  | 3489 | 10 | 52 | 3489 | 10 | 2.2 |  |
|  | 7 |  |  | 2525 | 5 | 25 | 2645 | 5 |  | 30.1 |
| DC__5A-7A-n78A | 7 |  | \|fB78 − fB7\| | 2550 | 5 | 25 | 2670 | 5 |  | N/A |
|  | n78 | IMD2 |  | 3429 | 10 | 52 | 3429 | 10 | 2.2 |  |
|  | 5 |  |  | 834 | 5 | 25 | 879 | 5 |  | 30.2 |

TABLE 12

| DC bands | UL DC | IMD | | UL Fc (MHz) | UL BW (MHz) | UL RB # | DL Fc (MHz) | DL BW (MHz) | CF (dB) | MSD (dB) |
|---|---|---|---|---|---|---|---|---|---|---|
| DC__1A-19A-n77A | 19 | IMD3 | \|fB77 − 2*fB19\| | 832.5 | 5 | 25 | 877.5 | 5 | 1.8 | N/A |
|  | n77 |  |  | 3795 | 10 | 52 | 3795 | 10 |  |  |
|  | 1 |  |  | 1940 | 5 | 25 | 2130 | 5 |  | 17.8 |
| DC__1A-19A-n79A | 1 | IMD3 | \|fB79 − 2*fB1\| | 1950 | 5 | 25 | 2140 | 5 | 2.0 | N/A |
|  | n79 |  |  | 4782.5 | 40 | 216 | 4782.5 | 40 |  |  |
|  | 19 |  |  | 837.5 | 5 | 25 | 882.5 | 5 |  | 18.3 |
| DC__3A-19A-n79A | 3 | IMD3 | \|fB79 − 2*fB3\| | 1775 | 5 | 25 | 1870 | 5 | 2.0 | N/A |
|  | n79 |  |  | 4435 | 40 | 216 | 4435 | 40 |  |  |
|  | 19 |  |  | 840 | 5 | 25 | 885 | 5 |  | 18.5 |
| DC__3A-21A-n79A | 21 | IMD3 | \|fB79 − 2*fB21\| | 1450.4 | 5 | 25 | 1498.4 | 5 | 2.0 | N/A |
|  | n79 |  |  | 4770 | 40 | 216 | 4770 | 40 |  |  |
|  | 3 |  |  | 1774.2 | 5 | 25 | 1869.2 | 5 |  | 17.8 |
| DC__19A-21A-n77A | 21 | IMD3 | \|fB77 − 2*fB21\| | 1450.4 | 5 | 25 | 1498.4 | 5 | 2.2 | N/A |
|  | n77 |  |  | 3783.3 | 10 | 52 | 3783.3 | 10 |  |  |
|  | 19 |  |  | 837.5 | 5 | 25 | 882.5 | 5 |  | 18.7 |
| DC__1A-5A-n78A | 5 | IMD3 | \|fB78 − 2*fB5\| | 829 | 5 | 25 | 874 | 5 | 2.0 | N/A |
|  | n78 |  |  | 3780 | 10 | 52 | 3780 | 10 |  |  |
|  | 1 |  |  | 1932 | 5 | 25 | 2122 | 5 |  | 18.1 |

TABLE 13

| DC bands | UL DC | | IMD | UL Fc (MHz) | UL BW (MHz) | UL RB # | DL Fc (MHz) | DL BW (MHz) | CF (dB) | MSD (dB) |
|---|---|---|---|---|---|---|---|---|---|---|
| DC_1A-3A-n77A | 1 | | IMD4 | \|fB77 − | 1950 | 5 | 25 | 2140 | 5 | 1.3 | N/A |
| | n77 | | | 3*fB1\| | 3980 | 10 | 52 | 3980 | 10 | | |
| | 3 | | | | 1775 | 5 | 25 | 1870 | 5 | | 8.5 |
| DC_1A-19A-n79A | 19 | | IMD4 | \|fB79 − | 837.5 | 5 | 25 | 882.5 | 5 | 1.2 | N/A |
| | n79 | | | 3*fB19\| | 4652.5 | 40 | 216 | 4652.5 | 40 | | |
| | 1 | | | | 1950 | 5 | 25 | 2140 | 5 | | 8.1 |
| DC_3A-19A-n79A | 19 | | IMD4 | \|fB79 − | 842.5 | 5 | 25 | 887.5 | 5 | 0.0 | N/A |
| | n79 | | | 3*fB19\| | 4420 | 40 | 216 | 4420 | 40 | | |
| | 3 | | | | 1782.5 | 5 | 25 | 1877.5 | 5 | | 0.2 |
| DC_3A-21A-n77A | 3 | | IMD4 | \|fB77 − | 1767.5 | 5 | 25 | 1862.5 | 5 | 1.5 | N/A |
| | n77 | | | 3*fB3\| | 3795 | 10 | 52 | 3795 | 10 | | |
| | 21 | | | | 1459.5 | 5 | 25 | 1507.5 | 5 | | 8.8 |
| DC_19A-21A-n77A | 19 | | IMD4 | \|fB77 − | 837.5 | 5 | 25 | 882.5 | 5 | 1.7 | N/A |
| | n77 | | | 3*fB19\| | 4015 | 10 | 52 | 4015 | 10 | | |
| | 21 | | | | 1454.5 | 5 | 25 | 1502.5 | 5 | | 9.0 |
| DC_1A-7A-n78A | 1 | | IMD4 | \|fB78 − | 1977.5 | 5 | 25 | 2167.5 | 5 | 1.8 | N/A |
| | n78 | | | 3*fB1\| | 3305 | 10 | 52 | 3305 | 10 | | |
| | 7 | | | | 2507.5 | 10 | 52 | 2627.5 | 10 | | 9.1 |
| DC_1A-7A-n78A | 7 | | IMD4 | \|2*fB78 − | 1975 | 5 | 25 | 2165 | 5 | 1.8 | N/A |
| | n78 | | | 2*fB7\| | 3310 | 10 | 52 | 3310 | 10 | | |
| | 1 | | | | 2550 | 10 | 52 | 2670 | 10 | | 8.6 |

TABLE 14

| DC bands | UL DC | IMD | UL Fc (MHz) | UL BW (MHz) | UL RB # | DL Fc (MHz) | DL BW (MHz) | CF (dB) | MSD (dB) |
|---|---|---|---|---|---|---|---|---|---|
| DC_1A-3A-n78A | 3 | IMD5 | \|2*fB78 − | 1775 | 5 | 25 | 1870 | 5 | 0.5 | N/A |
| | n78 | | 3*fB3\| | 3725 | 10 | 52 | 3725 | 10 | | |
| | 1 | | | 1935 | 5 | 25 | 2125 | 5 | | 2.8 |
| DC_1A-3A-n79A | 3 | IMD5 | \|fB79 − | 1750 | 5 | 25 | 1845 | 5 | 0.7 | N/A |
| | n79 | | 4*fB3\| | 4860 | 40 | 216 | 4860 | 40 | | |
| | 1 | | | 1950 | 5 | 25 | 2140 | 5 | | 3.6 |
| DC_1A-21A-n77A | 1 | IMD5 | \|2*fB77 − | 1950 | 5 | 25 | 2140 | 5 | 0.5 | N/A |
| | n77 | | 3*fB1\| | 3675 | 10 | 52 | 3675 | 10 | | |
| | 21 | | | 1452 | 5 | 25 | 1500 | 5 | | 2.9 |
| DC_3A-21A-n77A | 21 | IMD5 | \|fB77 − | 1450.4 | 5 | 25 | 1498.4 | 5 | 0.7 | N/A |
| | n77 | | 4*fB21\| | 3935 | 10 | 52 | 3935 | 10 | | |
| | 3 | | | 1771.6 | 5 | 25 | 1866.6 | 5 | | 3.4 |
| DC_19A-21A-n79A | 19 | IMD5 | \|fB79 − | 837.5 | 5 | 25 | 882.2 | 5 | 0.7 | N/A |
| | n79 | | 4*fB19\| | 4850 | 40 | 216 | 4850 | 40 | | |
| | 21 | | | 1452 | 5 | 25 | 1500 | 5 | | 3.8 |
| DC_1A-5A-n78A | 1 | IMD5 | \|2*fB78 − | 1975 | 5 | 25 | 2165 | 5 | 0.5 | N/A |
| | n78 | | 3*fB1\| | 3405 | 10 | 52 | 3405 | 10 | | |
| | 5 | | | 840 | 5 | 25 | 885 | 5 | | 3.1 |
| DC_5A-7A-n78A | 7 | IMD5 | \|2*fB78 − | 2525 | 5 | 25 | 2645 | 5 | 0.7 | N/A |
| | n78 | | 3*fB7\| | 3350 | 10 | 52 | 3350 | 10 | | |
| | 5 | | | 830 | 5 | 25 | 875 | 5 | | 3.3 |

Based on the test settings described in Table 11 to Table 14, MSD values may be derived. Based on the test setting and the proposed MSD levels described in Table 11 to Table 14, the second disclosure is proposed as follows.

Proposal 1: The 4DL/2UL, 5DL/2UL, and 6DL/2UL NSA DC band combinations do not need to define the MSD such as the LTE xDL/2 UL CA band combination.

Proposal 2: The provided MSD test setting and MSD values may be considered in defining the MSD requirements FIG. 10 is a flowchart according to the present disclosure and FIG. 11 illustrates an example according to the present disclosure.

Figure 10:
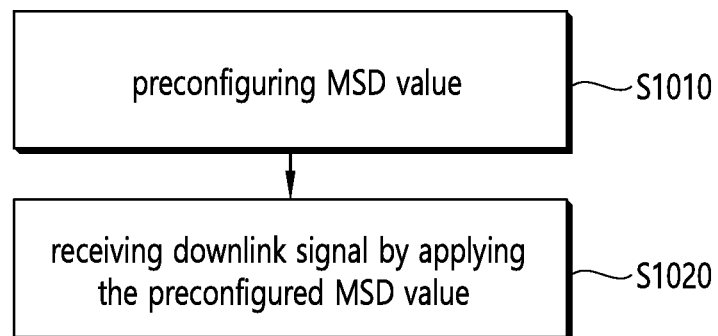
FIG. 10 is a flowchart of the present disclosure.
Figure 11:
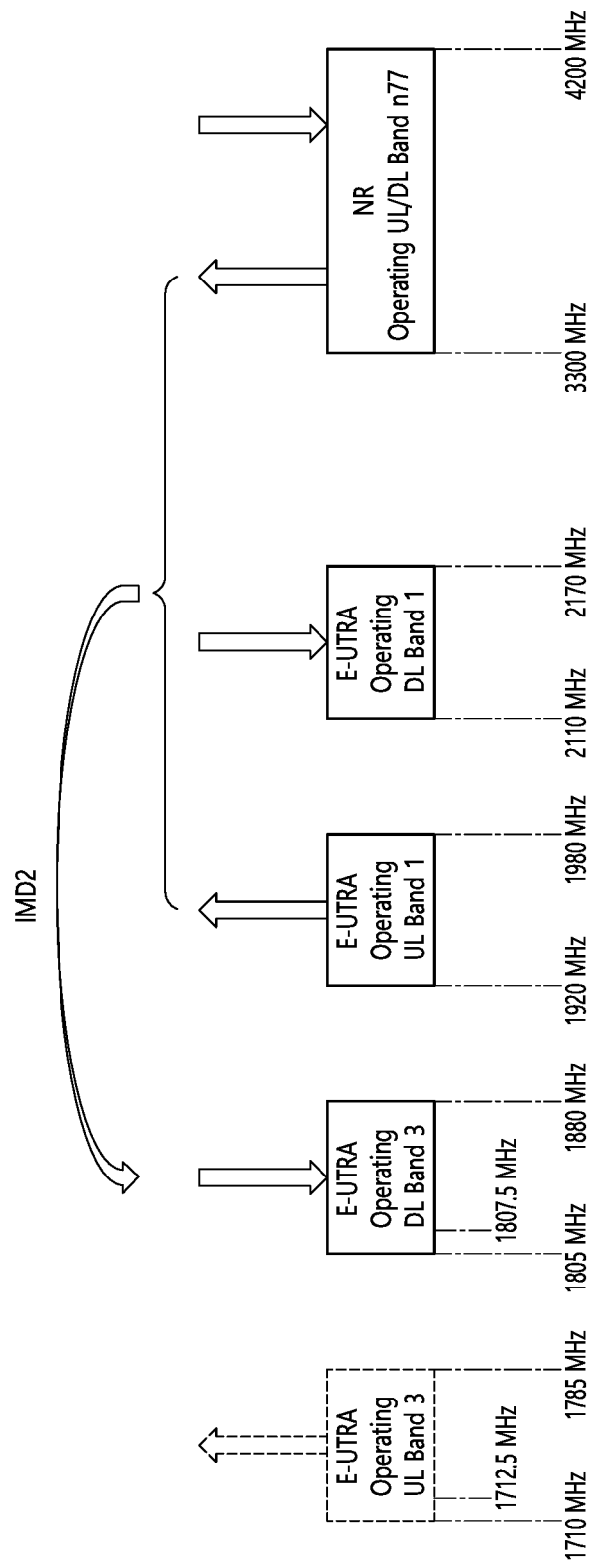
FIG. 11 illustrates an example of the present disclosure.

Referring to FIG. 10, a terminal supporting dual-connectivity between E-UTRA and NR may preconfigure maximum sensitivity degradation (MSD) regarding reference sensitivity (REFSENS) to apply the same to reception of a downlink signal (S1010). When receiving a downlink signal, the terminal may receive the downlink signal by applying the preconfigured MSD value (S1020).

As described above with reference to FIG. 8, in the case of the terminal (or UE) supporting dual-connectivity between E-UTRA and NR, when the terminal transmits an uplink signal through two uplink bands, a harmonic component (harmonics) and/or an intermodulation distortion (IMD) component generated according to a frequency band of the uplink signal may be introduced to a downlink band of the terminal. Here, in order to prevent a degradation of reception sensitivity of the downlink signal due to the harmonic component and/or the IMD component, the terminal may apply maximum sensitivity degradation (MSD) correcting the REFSENS.

Here, the preset MSD may be the MSD value described in Table 6 and Table 7 and Table 11 to Table 14. That is, when the conditions described in Table 6 and Table 7 and Table 11 to Table 14 are applied, the terminal may receive the downlink signal by applying the proposed MSD value.

For example, referring to FIG. 11 and Table 11, when the terminal supports dual-connectivity between the E-UTRA operating bands 1 and 3 and the NR operating band n77, if an uplink center frequency of the E-UTRA operating band 3 is 1712.5 MHz and a downlink center frequency of the E-UTRA operating band 3 is 1807.5 MHz, the second IMD (IMD2) may be introduced into the downlink operating band. Thus, in order to prevent a degradation of reception sensitivity of the downlink signal due to the second IMD component IMD2, the MSD value may be set to 31.5 dB to correct reference sensitivity.

Referring to Table 6, when the terminal supports dual-connectivity between the E-UTRA operating band 5 and the NR operating band n78, if an uplink center frequency of the E-UTRA operating band 5 is 844 MHz and a downlink center frequency of the UTRA operating band 5 is 889 MHz, a fourth IMD (IMD4) may be introduced into the downlink operating band. Thus, in order to prevent a degradation of reception sensitivity of the downlink signal due to the fourth IMD component IMD4, the MSD value may be set to 8.3 dB to correct reference sensitivity.

Figure 12:
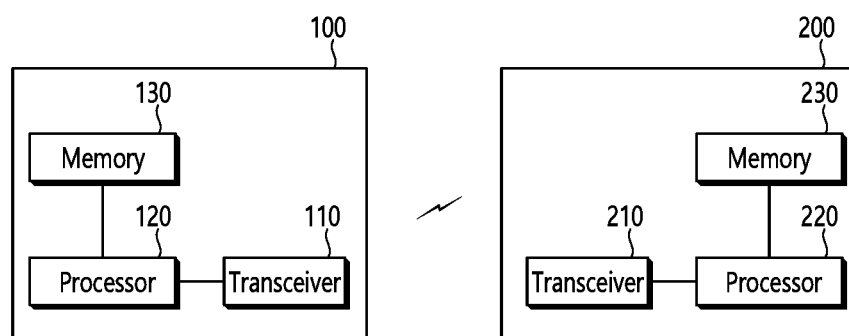
FIG. 12 is a block diagram illustrating a wireless communication system in which a disclosure of the present specification is implemented.

FIG. 12 is a block diagram illustrating a wireless communication system in accordance with one embodiment of the present disclosure.

Referring to FIG. 12, the wireless communication system includes at least one user equipment (UE, 100) and base station (200).

The UE 100 includes a transceiver 110, a processor 120 and a memory 130. The memory 130 is connected with the processor 120 to store various pieces of information for driving the processor 120. The transceiver 110 is connected with the processor 120 to transmit and/or receive the radio signal. The processor 120 implements a function, a process, and/or a method which are proposed.

The UE 100 may support dual-connectivity between E-UTRA and NR. When the UE 100 is configured to aggregate at least two carriers, the processor 120 may control the transceiver 110 to transmit the uplink signal using the uplink of the at least two carriers and receive the downlink signal using the downlink of the at least two carriers.

If the at least two carriers include at least one of the E-UTRA operating bands 1, 3, 5, and 7 and one of the NR operating bands n77, n78, and n79, the processor 120 may receive the downlink signal by applying the preset MSD according to Table 6 and Table 7 and Table 11 to Table 14.

That is, in the case of the UE 100 supporting dual-connectivity between E-UTRA and NR, when the UE 100 transmits an uplink signal through two uplink bands, a harmonic component and/or the IMD component generated according to a frequency band of the uplink signal may be introduced into a downlink band of the UE 100, and thus, in order to prevent a degradation of reception sensitivity of the downlink signal due to the harmonic component and/or the IMD component, the UE 100 may receive downlink signal by applying the MSD to correct the REFSENS.

Here, the preset MSD may be the MSD value described in Table 6 and Table 7 and Table 11 to Table 14. That is, when the conditions described in Table 6 and Table 7 and Table 11 to Table 14 are applied, the UE 100 may receive the downlink signal by applying the proposed MSD value.

For example, referring to Table 11, when the UE supports dual-connectivity between the E-UTRA operating band 1 and 5 and the NR operating band n78, if an uplink center frequency of the E-UTRA operating band 1 is 1932 MHz and a downlink center frequency of the E-UTRA operating band 1 is 2122 MHz, the third order IMD (IMD3) may be introduced into the downlink operating band. Thus, in order to prevent a degradation of reception sensitivity of the downlink signal due to the third IMD component IMD3, the MSD value may be set to 18.1 dB to correct the reference sensitivity.

The base station 200 includes a transceiver 210, a processor 220 and a memory 220. The memory 230 is connected with the processor 220 to store various pieces of information for driving the processor 220. The transceiver 210 is connected with the processor 220 to transmit and/or receive a radio signal. The processor 220 implements a function, a process, and/or a method which are proposed. In the aforementioned embodiment, the operation of the base station may be implemented by the processor 220.

The base station (BS) 200 may receive an uplink signal from the UE 100 using the transceiver 210 and transmit a downlink signal to the UE 100 using the transceiver 210. When the BS 200 transmits the downlink signal, the UE 100 may receive the downlink signal using the preset MSD value according to Table 6 and Table 7 and Table 11 to Table 14.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it may be appreciated by those skilled in the art that steps shown in the flowcharts are not exclusive and other steps may be included or one or more steps do not influence the scope of the present invention and may be deleted.

Figure 13:
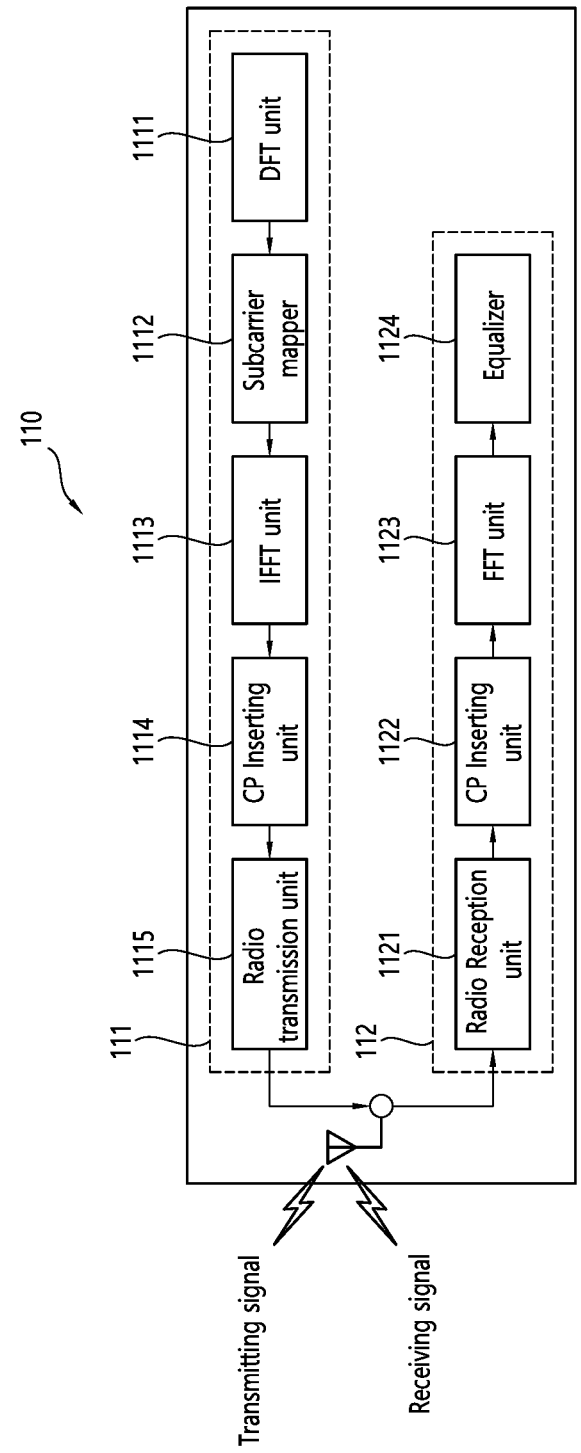
FIG. 13 is a detailed block diagram of a transceiver included in the wireless device shown in FIG. 12.

FIG. 13 is a detailed block diagram of a transceiver included in the wireless device shown in FIG. 12.

Referring to FIG. 13, the transceiver (110) includes a transmitter (111) and a receiver (112). The transmitter (111) includes a Discrete Fourier Transform (DFT) unit (1111), a subcarrier mapper (1112), an Inverse Fast Fourier Transform (IFFT) unit (1113), a CP inserter (1114), a radio transmitter (1115). The transmitter (111) may further include a modulator. Also, for example, the transmitter (111) may further include a scramble unit (not shown), a modulation mapper (not shown), a layer mapper (not shown), and a layer permutator (not shown), and these blocks may be positioned before the DFT unit (1111). More specifically, in order to prevent an increase in the peak-to-average power ratio (PAPR), the transmitter (111) allows information to pass through the DFT unit (1111) beforehand prior to mapping a signal to a subcarrier. After performing subcarrier mapping, a signal that is spread (or precoded, in the same sense) by the DFT unit (1111) through the subcarrier mapper (1112), a signal within a time axis is generated (or created) after the processed signal passes through the Inverse Fast Fourier Transform (IFFT) unit (1113).

The DFT unit (1111) performs DFT on the inputted symbols, thereby outputting complex number symbols (complex-valued symbols). For example, if Ntx symbols are inputted (wherein Ntx is an integer), a DFT size is equal to Ntx. The DFT unit (1111) may also be referred to as a transform precoder. The subcarrier mapper (1112) maps the complex number symbols to each subcarrier of the frequency domain. The complex number symbols may be mapped to resource elements corresponding to resource blocks being assigned for data transmission. The subcarrier mapper (1112) may also be referred to as a resource element mapper. The IFFT unit (1113) performs IFFT on the inputted symbols, thereby outputting a baseband signal for data, which correspond to a time domain signal. The CP inserter (1114) duplicates (or copies) an end part of the baseband signal for the data and inserts the duplicated part to a front part of the baseband signal for the data. By performing CP insertion, Inter-Symbol Interference (ISI) and Inter-Carrier Interference (ICI) may be prevented, thereby allowing orthogonality to be maintained even in a multi-path channel.

Meanwhile, the receiver (112) includes a radio receiver (1121), a CP remover (1122), a Fast Fourier Transform (FFT) unit (1123), and an equalizer (1124). The radio receiver (1121), the CP remover (1122), and the FFT unit (1123) of the receiver (112) respectively perform the inverse functions of the radio transmitter (1115), the CP inserter (1114), and the IFFT unit (1113) of the transmitter (111). The receiver (112) may further include a demodulator.

What is claimed is:

1. A terminal comprising:
   a transceiver configured with dual-connectivity between an evolved universal terrestrial radio access (E-UTRA) and a new radio (NR); and
   a processor controlling the transceiver to perform a dual uplink operation,
   wherein the dual uplink operation generates an intermodulation product,
   wherein the E-UTRA is configured with at least one or two of E-UTRA operating bands 1, 3, 5, and 7,
   wherein the NR is configured with one of NR operating bands n77, n78, and n79; and
   wherein based on (i) an uplink center frequency of a first operating band among the E-UTRA operating bands and the NR operating bands being a first value, and based on (ii) a downlink center frequency of the first operating band being a second value, a reference sensitivity is allowed to be relaxed by a predetermined value for maximum sensitivity degradation (MSD).

2. The terminal of claim 1, wherein when the E-UTRA is configured with the E-UTRA operating band 5, the NR is configured with the NR operating band n78, the first operating band is the E-UTRA operating band 5, the first value is 844 MHz, the second value is 889 MHz, and the predetermined value for the MSD value is 8.3 dB.

3. The terminal of claim 1, wherein when the E-UTRA is configured with the E-UTRA operating bands 1 and 3, the NR is configured with the NR operating band n77, the first operating band is the E-UTRA operating band 3, the first value is 1712.5 MHz, the second value is 1807.5 MHz, and the predetermined value for the MSD value is 31.5 dB.

4. The terminal of claim 1, wherein when the E-UTRA is configured with the E-UTRA operating bands 1 and 3, the NR is configured with the NR operating band n77, the first operating band is the E-UTRA operating band 1, the first value is 1950 MHz, the second value is 2140 MHz, and the predetermined value for the MSD value is 31.0 dB.

5. The terminal of claim 1, wherein when the E-UTRA is configured with the E-UTRA operating bands 1 and 3, the NR is configured with the NR operating band n78, the first operating band is the E-UTRA operating band 3, the first value is 1712.5 MHz, the second value is 1807.5 MHz, and the predetermined value for the MSD value is 31.2 dB.

6. The terminal of claim 1, wherein when the E-UTRA is configured with the E-UTRA operating bands 5 and 7, the NR is configured with the NR operating band n78, the first operating band is the E-UTRA operating band 7, the first value is 2525 MHz, the second value is 2645 MHz, and the predetermined value for the MSD value is 30.1 dB.

7. The terminal of claim 1, wherein when the E-UTRA is configured with the E-UTRA operating bands 5 and 7, the NR is configured with the NR operating band n78, the first operating band is the E-UTRA operating band 5, the first value is 834 MHz, the second value is 879 MHz, and the predetermined value for the MSD value is 30.2 dB.

8. The terminal of claim 1, wherein when the E-UTRA is configured with the E-UTRA operating bands 1 and 5, the NR is configured with the NR operating band n78, the first operating band is the E-UTRA operating band 1, the first value is 1932 MHz, the second value is 2122 MHz, and the predetermined value for the MSD value is 18.1 dB.

9. The terminal of claim 1, wherein when the E-UTRA is configured with the E-UTRA operating bands 1 and 3, the NR is configured with the NR operating band n77, the first operating band is the E-UTRA operating band 3, the first value is 1775 MHz, the second value is 1870 MHz, and the predetermined value for the MSD value is 8.5 dB.

10. The terminal of claim 1, wherein when the E-UTRA is configured with the E-UTRA operating bands 1 and 7, the NR is configured with the NR operating band n78, the first operating band is the E-UTRA operating band 7, the first value is 2507.5 MHz, the second value is 2627.5 MHz, and the predetermined value for the MSD value is 9.1 dB.

11. The terminal of claim 1, wherein when the E-UTRA is configured with the E-UTRA operating bands 1 and 3, the NR is configured with the NR operating band n78, the first operating band is the E-UTRA operating band 1, the first value is 1935 MHz, the second value is 2125 MHz, and the predetermined value for the MSD value is 2.8 dB.

12. The terminal of claim 1, wherein when the E-UTRA is configured with the E-UTRA operating bands 1 and 3, the NR is configured with the NR operating band n79, the first operating band is the E-UTRA operating band 1, the first value is 1950 MHz, the second value is 2140 MHz, and the predetermined value for the MSD value is 3.6 dB.

13. The terminal of claim 1, wherein when the E-UTRA is configured with the E-UTRA operating bands 1 and 5, the NR is configured with the NR operating band n78, the first operating band is the E-UTRA operating band 5, the first value is 840 MHz, the second value is 885 MHz, and the predetermined value for the MSD value is 3.1 dB.

14. The terminal of claim 1, wherein when the E-UTRA is configured with the E-UTRA operating bands 5 and 7, the NR is configured with the NR operating band n78, the first operating band is the E-UTRA operating band 5, the first value is 830 MHz, the second value is 875 MHz, and the predetermined value for the MSD value is 3.3 dB.

* * * * *